April 28, 1942.   S. G. WINGQUIST   2,281,403
UNIVERSAL JOINT
Original Filed Sept. 28, 1940

Inventor,
S. G. Wingquist
By: Glascock Downing & Seebold
Attorneys.

Patented Apr. 28, 1942

2,281,403

UNITED STATES PATENT OFFICE 2,281,403

UNIVERSAL JOINT

Sven Gustaf Wingquist, Remningstorp, Sweden

Original application September 28, 1940, Serial No. 358,921. Divided and this application April 11, 1941, Serial No. 388,158. In Sweden July 16, 1940

5 Claims. (Cl. 64—17)

The present invention refers to universal joints having one centre of deflection and comprising a driving and a driven joint member provided with axially projecting lugs, between which roller bodies are placed, which effect the transmission of movement between the joint members, the present application being a division of my pending application Serial No. 358,921, filed September 28, 1940.

Generally, joints of this art are mounted on a telescopic shaft, which takes up length variations occurring during the drive and due to frictional forces caused hereby acts pulling or pushing on the joint.

Thus, separate means must be provided in order to keep the joint members together axially with respect to pulling as well as pushing forces.

To this end universal joints of the art mentioned in most cases have been provided with spherical cups enclosing the joint members and taking up pulling forces and with a centrally disposed spherical member, such as a ball, for taking up pushing forces.

However, such devices are relatively complicated and cause, when the joint members occupy a deflected position relatively to each other, considerable frictional forces and, as a consequence, a considerable wear.

The present invention has for its object to avoid the above mentioned drawbacks and consists essentially in this that placed inside the lugs of the joint members is a rigid member having four crosswisely placed teeth meshing with corresponding tooth spaces in the said lugs.

At axial pulling or pressing on the joint members diametrically opposed teeth will hereby by pairs be exposed to power moments counteracting each other, so that the joint members will be kept together axially by themselves. Besides, when the joint members occupy a deflected position relatively to each other, the movements of the said connecting member relatively to the lugs of the joint members will cause no considerable friction and wear.

Further, by placing the said connecting member inside the projecting lugs, where a free space always is disposable, the said member will not bring about any increase of the dimensions of the joint proper, and simultaneously the said member may without difficulty be made with such dimensions, which are required for taking up the greatest stresses normally occurring.

The annexed drawing shows an embodiment of a device according to this invention applied to a universal joint adapted for power transmission in both directions.

Figure 1:
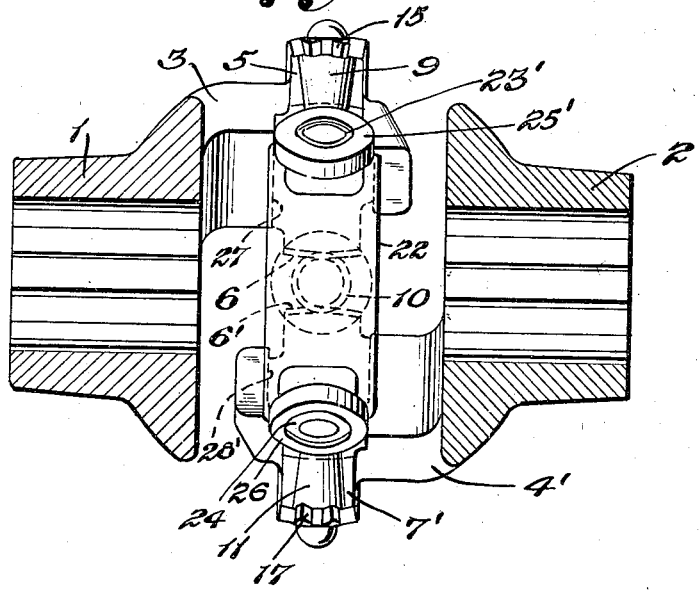
Figure 2:
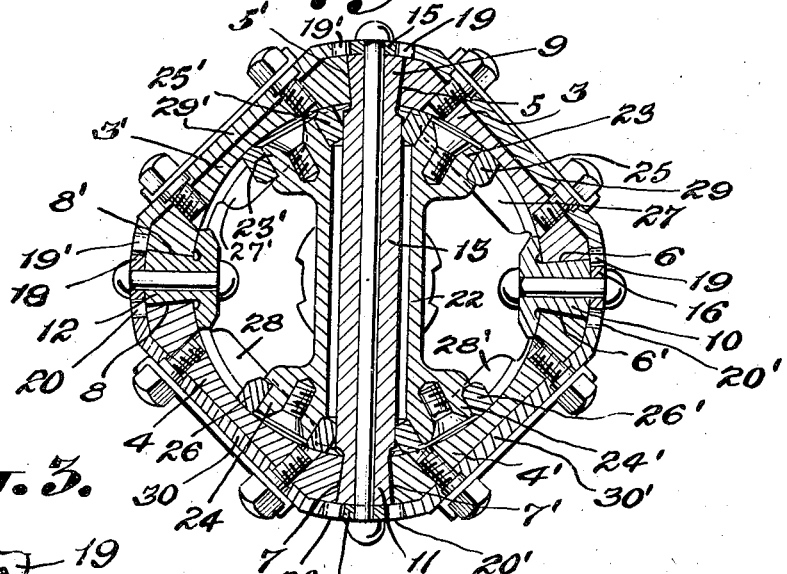
Figure 3:
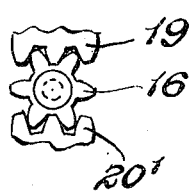

In the drawing, Fig. 1 is an axial section, Fig. 2 a cross-section, and Fig. 3 a detail view of the joint.

Referring to the drawing, 1 denotes the driving joint member and 2 the driven joint member. Each of said members is provided with two diametrically opposed lugs 3, 4 and $3^1$, $4^1$, respectively, which, in the embodiment shown, are provided on both sides with races 5, 6 and 7, 8 and $5^1$, $6^1$ and $7^1$, $8^1$, respectively. Placed between the proximate races 5—$5^1$, 6—$6^1$, 7—$7^1$ and 8—$8^1$ on the lugs are conical roller bodies, 9, 10, 11 and 12, respectively, having the apex located in the centre of deflection of the joint. The diametrically opposed rollers 9 and 11, which are formed at the ends of a bolt 13 serving as a rigid transmission member, are adapted for forward running, whereas the separate rollers 10 and 12 are adapted for the running in the opposite direction.

Secured to the rollers 9, 10, 11, 12 by riveting are pinions 15, 16, 17 and 18, respectively, which mesh with corresponding teeth 19, $19^1$, 20, $20^1$ at the ends of bent strips 29, $29^1$, 30, $30^1$ firmly secured to the corresponding lugs 3, $3^1$, 4 and $4^1$, respectively, by means of screws.

For the axial keeping together of the joint a separate member is provided having the shape of a sleeve 22 surrounding the shaft 13 and provided with two pairs of diametrically opposed gudgeons 23, 24 and $23^1$, $24^1$, respectively, forming an oblique cross. Placed on the said gudgeons are rotatable rollers 25, 26 and $25^1$, $26^1$, respectively, serving as toothed elements and meshing with corresponding slots 27, 28, $27^1$, $28^1$ made in the joint arms 3, 4 and $3^1$, $4^1$, respectively, and having a spherical bottom.

The generatrix-angle of the roller bodies 9, 10, 11, 12 is small, the non-uniformity with respect to the angular speeds of the driving and the driven joint shafts being thereby small. On the other hand, the cross 22, 23, 24, $23^1$, $24^1$ forms as an approximate body of rotation a double-cone having the generatrix passing through the centres of the gudgeons and through the centre of deflection of the joint and having a generatrix-angle, which is less than that of the roller bodies 9 to 12.

When the joint acts with a broken shaft-angle, the cross does not follow the rigid transmission member 9, 11, 13 quite coaxially since said members deviate from the bisectrix-plane at different angles. For this reason the shaft 13 of the transmission member is capable of moving freely in the cross-sleeve with a play sufficient for the said deviations, but resting against the rollers of the cross at the moments (two times at each revolution), when the two members are coaxial. Thus, after each deviation from the bisectrix-plane the transmission member will bring back the cross to the coaxial position.

At the deflection of the joint members 1 and 2 the toothed elements 15, 16, 17, 18 on the rollers and the corresponding toothed elements 19, $19^1$, 20, $20^1$ on the joint arms effect the adjustment of the rollers in their correct positions on the races 5, $5^1$, 6, $6^1$, 7, $7^1$ and 8, $8^1$, while the member 22 with its gudgeons and rollers and by the mesh of said rollers with the joint arms effects the axial keeping together of the joint members, in as much as at pulling or thrust on the joint members the diametrically opposed gudgeons 23, 24 and $23^1$, $24^1$ will be exposed to power moments counter-acting each other. The rollers 25, $25^1$, 26, $26^1$ act in the slots 27, $27^1$, 28, $28^1$ in the manner as teeth in tooth spaces.

Evidently, the invention is applicable also to other embodiments of universal joints than that one shown in the drawing and operating with rollers as power transmission elements, and the teeth of the connecting member may be made in other manner than as rotatable rollers.

What I claim as new and desire to secure by Letters Patent of the United States is:

1. A universal joint having one centre of deflection, comprising a driving member, a driven member, axially projecting lugs on each of said members, races on said lugs, power transmitting roller bodies between proximate races on said lugs, a rigid connecting member placed inside said lugs, four crosswisely placed teeth on said connecting member, and tooth spaces in said lugs in mesh with said teeth.

2. A universal joint having one centre of deflection, comprising a driving member, a driven member, axially projecting lugs on each of said members, races on said lugs, power transmitting roller bodies between proximate races on said lugs, a rigid connecting member placed inside said lugs, four crosswisely placed teeth on said connecting member, and tooth spaces in said lugs in mesh with said teeth, said connecting member being free to perform a rolling motion independent of the rolling motion of said roller bodies.

3. A universal joint having one centre of deflection, comprising a driving member, a driven member, axially projecting lugs on each of said members, races on said lugs, power transmitting conical roller bodies between proximate races on said lugs, a rigid connecting member placed inside said lugs, four crosswisely placed teeth on said connecting member, and tooth spaces in said lugs in mesh with said teeth, said connecting member being free to perform a rolling motion independent of the rolling motion of said roller bodies, the cone-angle of said crosswisely placed teeth and the corresponding angle of said conical roller bodies being different so as to provide for different deviations from the bisectrix-plane of said connecting member and said roller bodies.

4. A universal joint having one centre of deflection, comprising a driving member, a driven member, axially projecting lugs on each of said members, races on said lugs, power transmitting roller bodies between proximate races on said lugs, a rigid connecting member placed inside said lugs, four crosswisely placed teeth in the form of rotatable rollers on said connecting member, and teeth spaces in said lugs in mesh with said roller tooth.

5. A universal joint having one centre of deflection, comprising a driving member, a driven member, axially projecting lugs on each of said members, races on said lugs, power transmitting roller bodies between proximate races on said lugs, a rotatable cross shaft having its axis passing through the center of the joint for connecting two of said roller bodies, a rigid sleeve-shaped connecting member between and inside said lugs and surrounding said cross shaft with play, four teeth on said connecting member in the form of an oblique cross, and tooth spaces in said lugs in mesh with said teeth.

SVEN GUSTAF WINGQUIST.